S. G. MASON.
VEHICLE-HUB.

No. 195,145. Patented Sept. 11, 1877.

Witnesses
L. A. Watson.

Inventor
S. G. Mason,
by His atty.
G. B. Selden.

UNITED STATES PATENT OFFICE.

SYLVESTER G. MASON, OF CROWN POINT, NEW YORK.

IMPROVEMENT IN VEHICLE-HUBS.

Specification forming part of Letters Patent No. 195,145, dated September 11, 1877; application filed April 26, 1877.

*To all whom it may concern:*

Be it known that I, SYLVESTER G. MASON, of Crown Point, Essex county, New York, have invented an Improvement in Vehicle-Hubs, of which the following is a specification:

My invention relates to an improvement in the mode of securing the spokes in the hubs of carriage or other wheels; and it consists, in substance, in combining a series of radial wedges, placed between the spokes, with hollow cone-shaped collars on each side of the spokes, by which the spokes are supported laterally, and at the same time the wedges are forced inwardly toward the center of the hub, securing the spokes in place by a pressure equally distributed about the hub. It also consists in the combination, with the before-mentioned devices, of an annular wedge adjustable longitudinally to expand the spokes in the wheel; and also in the construction of the hollow collars for supporting the spokes laterally.

Figure 1:
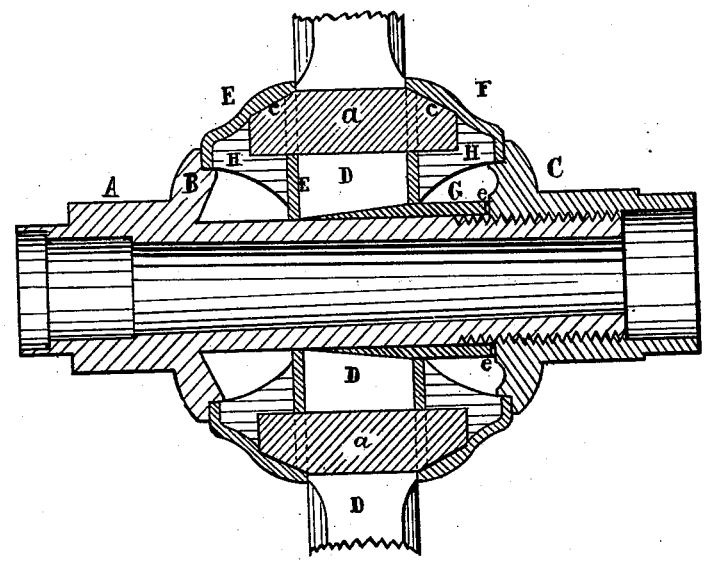
Figure 2:
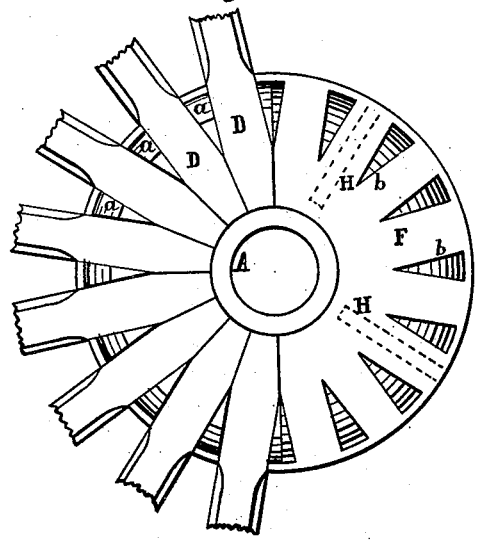

In the accompanying drawings, Figure 1 is a central longitudinal section through the center of a wheel-hub embodying my invention; and Fig. 2 is an end view of the same, one collar being removed in the left-hand half of the figure, showing the spokes and wedges in place, and the other half of the figure representing the face of the collar opposed to the spokes.

In the accompanying drawings, A is a sleeve, which is bored to fit the axle of the carriage, and is provided at one end with a collar, B. The other end of the sleeve A is threaded, and a screw-collar, C, the outside of which is shaped into a nut, is fitted on it. D D represent the spokes, which are beveled on their flat sides and fitted together, as shown in Fig. 2; and *a a*, Figs. 1 and 2, are wedges fitted between the spokes. E and F are hollow collars, of any desired shape on the outside, but flat on the side which fits against the edges of the spokes, which they support laterally. These collars are fitted accurately to the sleeve A, and are clamped together against the spokes between the collar B and the nut C by screwing up the latter. The wedges *a a* are longer than the width of the spokes, and their outer ends are beveled off, as shown in Fig. 1, and project through openings *b b*, Fig. 2, in the inner flat sides of the collars E and F. The openings *b b* are a trifle larger than the wedges; and the inner surfaces of the collars E and F, at *c c*, Fig. 1, where they come in contact with the beveled ends of the wedges, being made conical to suit this bevel, the effect of forcing the two collars together is to clamp the spokes tightly on the edges, while at the same time the wedges *a a* are forced inwardly toward the center of the hub, binding the spokes together with a pressure equally distributed around the hub. The spokes are thus secured in the hub by a pressure in both directions, and in a manner which admits of the easy removal of any one or more of the spokes by unscrewing the collar C, or of an increased pressure being put upon them, at will.

The wedges *a a* may be of any suitable material, and the collars E and F may be extended radially to any desired degree to support the spokes laterally.

Instead of the openings *b b* through the inner face of the collars E and F, an annular groove may be made in the collars to receive the ends of the wedges—a mode of construction which admits of the use of the same patterns for wheels of any desired number of spokes.

The conical surface of the collars may also be made to project inwardly between the spokes, in which case the length of the wedges may be reduced.

The ends of the spokes may be made square, and rest directly on the sleeve A; or, in case it is desired to make a wheel in which the spokes can be slightly expanded for the purpose of tightening the tire, the annular wedge G, Fig. 1, may be used between the sleeve and the ends of the spokes. In this case the inner ends of the spokes are beveled, as shown in Fig. 1, and rest against the annular wedge G, which is accurately fitted to the sleeve A, and is forced longitudinally along the sleeve, expanding the spokes, by an independent nut on the sleeve A, or by the nut C, a washer of suitable thickness to accomplish the desired result being interposed at *e*, Fig. 1, between the wedge G and the nut C.

The collar E may be in one piece with the sleeve A and collar B; and, if the radial openings *b b* be not used, the collar F may be cast with the nut C.

In the construction shown in the drawings the outer and inner faces of the collars E and F are tied together by bridges H H, Fig. 1, (shown in dotted lines in Fig. 2,) which resist the compression of the nut C.

In making a dishing wheel, the proper inclination should be given to the inner faces of the collars E and F.

I claim—

1. The combination of the sleeve A, spokes D D, beveled wedges $a\ a$, collars E and F, and nut C, substantially as and for the purpose set forth.

2. The combination of the spokes D D, beveled wedges $a\ a$, and conical collars E and F, provided with radial openings $b\ b$, substantially as set forth, 3. The collar E, composed of an outer and inner shell, and provided with bridges H H and openings $b\ b$, substantially as set forth.

4. The combination of the sleeve A, conical collars E and F, spokes D D, wedges $a\ a$, annular wedge G, and nut C, operating substantially as and for the purposes set forth.

SYLVESTER G. MASON.

Witnesses:
A. D. McMaster,
L. A. Watson.